US008580325B2

(12) United States Patent  (10) Patent No.: US 8,580,325 B2
Meisinger et al.  (45) Date of Patent: *Nov. 12, 2013

(54) VASE FOR USE WITH FOOD PRODUCTS

(76) Inventors: M. Kathleen Meisinger, Milwaukee, WI (US); David A. Meisinger, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,092

(22) Filed: Aug. 29, 2012

(65) Prior Publication Data

US 2012/0321758 A1   Dec. 20, 2012

Related U.S. Application Data

(63) Continuation of application No. 12/054,709, filed on Mar. 25, 2008, now Pat. No. 8,276,315.

(60) Provisional application No. 60/910,258, filed on Apr. 5, 2007.

(51) Int. Cl.
   *B65D 85/78*   (2006.01)

(52) U.S. Cl.
   USPC ........... 426/132; 426/134; 426/104; 426/383; 47/41.11; 47/41.01; 47/41.14; 206/443; 431/295

(58) Field of Classification Search
   USPC ........ 426/132, 134, 104, 383; 47/41.01, 41.1, 47/41.11–41.15; 206/443; 431/295
   See application file for complete search history.

(56) References Cited

U.S. PATENT DOCUMENTS

| 1,826,500 | A | 11/1930 | Blake |
| 1,831,047 | A | 11/1931 | Thomas |
| 1,928,391 | A | 9/1933 | Niklason |
| 1,979,911 | A | 11/1934 | Steudel |
| 2,003,612 | A | 6/1935 | Schnaier |
| 2,043,846 | A | 6/1936 | Wise |
| 2,496,758 | A | 2/1950 | Tingley |
| 2,591,261 | A | 4/1952 | Holahan |
| 2,686,989 | A | 8/1954 | Dillon et al. |
| 2,811,030 | A | 10/1957 | Tannahill |
| 2,900,760 | A | 8/1959 | Tupper |
| 2,924,330 | A | 2/1960 | Ballard |

(Continued)

FOREIGN PATENT DOCUMENTS

JP        2007068860 A        3/2007

OTHER PUBLICATIONS

Wilton. "Flower Spikes." Available on the Internet at<URL:http://web.archive.org/web/20060328224330/http://wilton.com/store/site/product.cfm?id=3E312C10-475-BAC0-5D34A3D60BDDF27&/fid=3E331274-475A-BAC0-5041EF53F94DDB26>. Date: Mar. 28, 2006.

(Continued)

*Primary Examiner* — Drew Becker
*Assistant Examiner* — Luana Z Long
(74) *Attorney, Agent, or Firm* — Jansson Munger McKinley & Shape Ltd.

(57) ABSTRACT

Vase apparatus and decorating methods for associating flowers and other decorative items with cakes and other food products are described. Vase embodiments include a water-holding reservoir having a bottom wall, an upright rim, and plural flower-stem-receiving wells. Each well is defined by at least one well wall depending from the bottom wall and has an opening capable of receiving water from the reservoir. Vase embodiments may include a reservoir of various shapes and sizes. Vases may be placed on a cake or other food product permitting the cake or food product to be attractively and easily decorated.

19 Claims, 7 Drawing Sheets

(56) References Cited

U.S. PATENT DOCUMENTS

| | | |
|---|---|---|
| 3,158,524 A | 11/1964 | Tong |
| 3,177,617 A | 4/1965 | Koistinen |
| D202,209 S | 9/1965 | Meyers et al. |
| 3,477,680 A | 11/1969 | Fliger, Jr. |
| 4,106,234 A | 8/1978 | Gallo |
| 4,281,474 A | 8/1981 | Gallo |
| 4,884,966 A | 12/1989 | Wexler |
| 4,958,461 A | 9/1990 | Aldrich |
| 5,018,624 A | 5/1991 | Arneson et al. |
| 5,379,550 A | 1/1995 | Beljjaars |
| 5,546,697 A | 8/1996 | Lymberis et al. |
| 5,586,410 A | 12/1996 | Gallo |
| 5,676,581 A | 10/1997 | Zielger |
| 5,683,762 A | 11/1997 | Banschick |
| D446,083 S | 8/2001 | Marsh et al. |
| 6,536,361 B1 | 3/2003 | Wu |
| D482,374 S | 11/2003 | Fan |
| 8,276,315 B2 | 10/2012 | Meisinger et al. |
| 2003/0152659 A1 | 8/2003 | McCloskey et al. |
| 2006/0185234 A1 | 8/2006 | Fitzgerald |
| 2008/0268392 A1 | 10/2008 | Bern |

OTHER PUBLICATIONS

Tetra. "Solid Racks." Available on the Internet at <URL:http://web.archive.org/web/20060820212432/http://www.testtuberacks.com/TACKTYPES2.htm>. Date: Aug. 20, 2006.
International Search Report for PCT International Application No. PCT/US08/03891. Date: Jul. 21, 2008.
International Preliminary Report on Patentability for PCT International Application No. PCT/US08/03891. Date: Oct. 15, 2009.
U.S. Appl. No. 13/598,070, filed Aug. 29, 2012.

VASE FOR USE WITH FOOD PRODUCTS

RELATED APPLICATION

This application is a continuation of U.S. patent application Ser. No. 12/054,709, filed Mar. 25, 2008, now U.S. Pat. No. 8,276,315, and claims the benefit of U.S. Provisional Patent Application Ser. No. 60/910,258 filed Apr. 5, 2007. The entire contents of such applications are incorporated herein by reference.

FIELD

The field relates to decorating, and more particularly, to food-product decorating using vases for associating flowers and other articles with food products.

BACKGROUND

Many different types of floral vases and water tubes, for various applications and locations, are known in the art. Such vases/tubes are used for mounting flowers in a floral arrangement while hydrating the flowers to avoid flower wilting. These devices are useful to keep floral arrangements supported therein fresh and attractive for extended periods of time. When a traditional floral water tube is used, generally the stem of each flower is inserted into the water-filled tube reservoir. The floral water tube usually has a narrowed end which is placed into soil, a pot or some other container, is used for a corsage or a stand-alone floral bouquet, or is used in some other form of decorative floral arrangement. Various floral vases/tubes have been developed for mounting hydrated flowers in a floral arrangement. Examples of such vases/tubes are disclosed in U.S. Pat. Nos. 5,586,410 (Gallo); 5,546,697 (Lymberis, et al.); 4,281,474 (Gallo); 4,106,234 (Gallo) and U.S. Publication No. 2006/0185234 (Fitzgerald).

Also known in the art is the insertion of the stems of fresh flowers and other floral products into a quantity of florist's foam (or a "flower frog") which, in turn, is resting in water in an "oasis" or vase or other water receiving device. Oftentimes many flowers and floral products are inserted into a single piece of florist's foam (or flower frog or other similar item) resting in a water receiving device as a form of decorative floral arrangement.

While these vases/tubes may be effective for their intended purpose, there is opportunity for improvement. For example, floral water tubes and similar devices are typically used for holding a single flower and are not well-suited for holding several or many flowers.

And, floral water tubes and vases are not particularly well-suited for use with cakes and other food products. This is because such tubes/vases may permit the flower or plant material, or water in the tube or vase, to contact the cake or food product. It is preferable that contact between the flowers or plant material be avoided or limited, if possible. For example, flowers and plant material may be treated with preservatives and/or pesticides at some point in their product cycle. And, flowers and plant material can carry microorganisms or contaminants. Certain flowers and plant material are even toxic and/or poisonous. These materials can be transferred from the flowers or plant material to the cake or food product, potentially resulting in transfer to a person who eats the cake or food product. Furthermore, contact between the flowers or plant material and the cake or other food product can result in food discoloration or potentially impair the appearance or flavor of the cake or food product.

Floral tubes and vases are not particularly well-suited for supporting flowers on a cake or other food product in a way which permits a high-level of design or decorative flexibility or creativity for a pastry chef, cake designer or anyone else decorating a cake or other food product to create beautiful and decorative floral arrangements which complement and enhance the appearance of a cake or other food product. For example, it may be desirable to cover the entire top surface of a cake with an ornate floral arrangement. Existing tubes and vases tend to have generally limited capacity, may not be manufactured from food-safe material, and are provided in shapes and sizes which require many tubes and/or vases or other similar items to cover a cake or food product.

It would represent an advance in the art to provide vases which would provide anyone who decorates a cake or other food product with the capability to create beautiful/decorative cakes and food products combined with flowers, floral arrangements and other decorations, which would enhance food safety, quality and/or appearance, and which would be simple and easy to use.

BRIEF DESCRIPTION OF THE DRAWINGS

The foregoing and other objects, features and advantages will be apparent from the following description of preferred embodiments, as illustrated in the accompanying drawings in which like reference characters refer to the same parts throughout the different views. The drawings are not necessarily to scale, emphasis instead being placed upon illustrating the principles of the invention. In the drawings.

DETAILED DESCRIPTION

Figure 1:
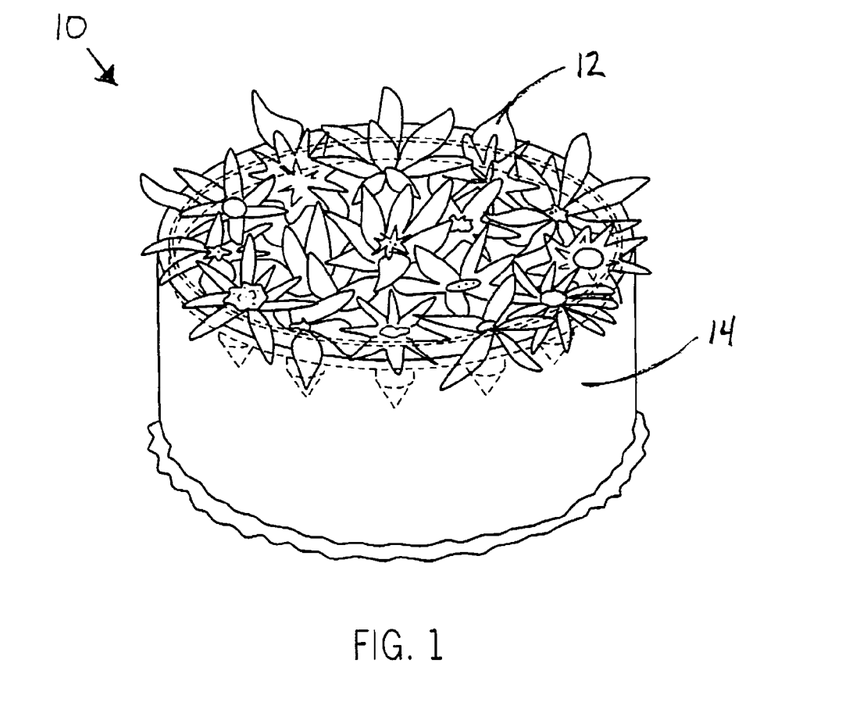
FIG. 1 is a perspective view of a vase embodiment holding a floral arrangement on a cake-type food product.
Figure 2:
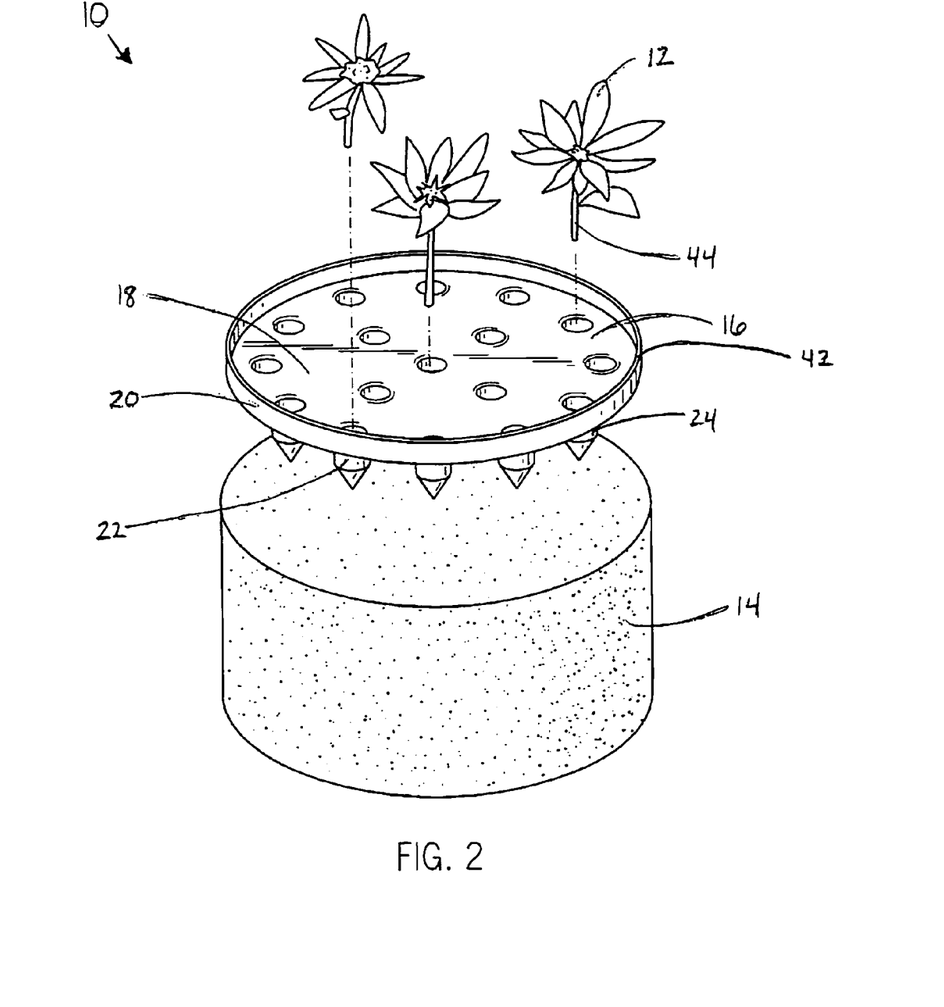
FIG. 2 is an exploded view of the vase of FIG. 1 a cake, and certain flowers.
Figure 3:
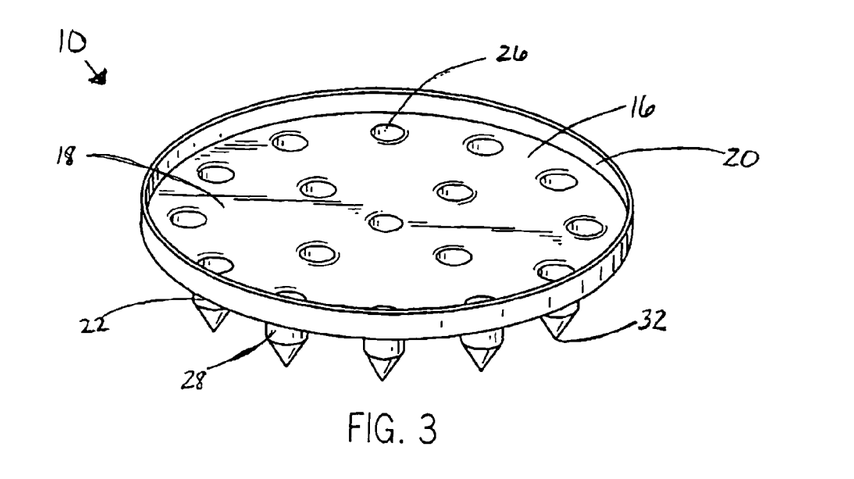
FIG. 3 is a top perspective view of the vase of FIG. 1.
Figure 4:
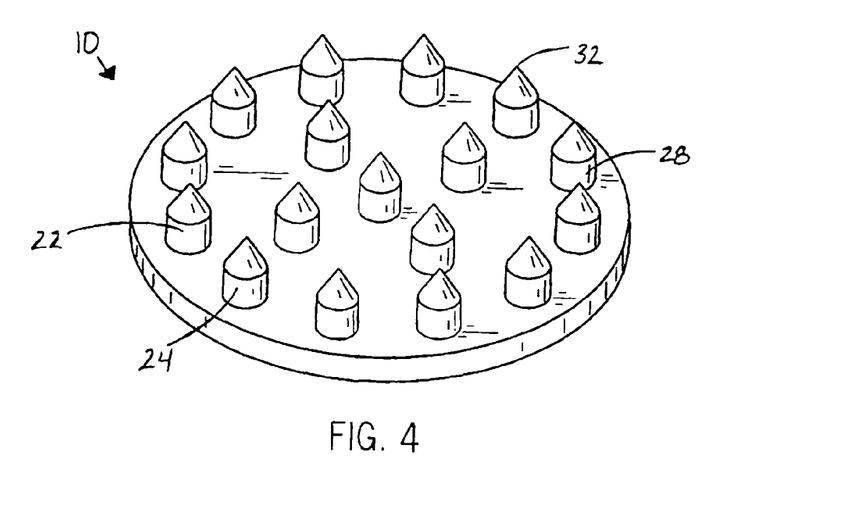
FIG. 4 is a bottom perspective view of the vase of FIG. 1.
Figure 5:
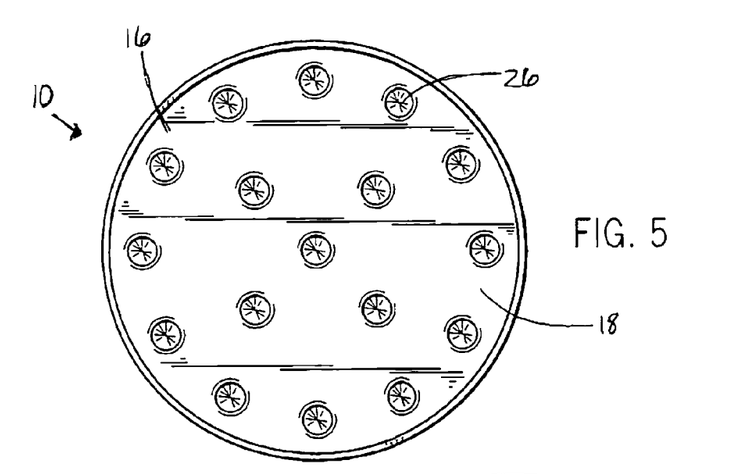
FIG. 5 is a top plan view of the vase of FIG. 1.
Figure 6:
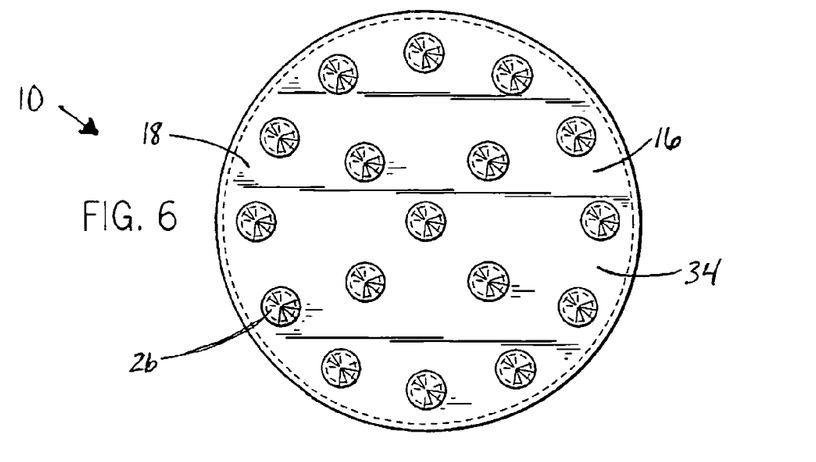
FIG. 6 is a bottom plan view of the vase of FIG. 1.
Figure 7:
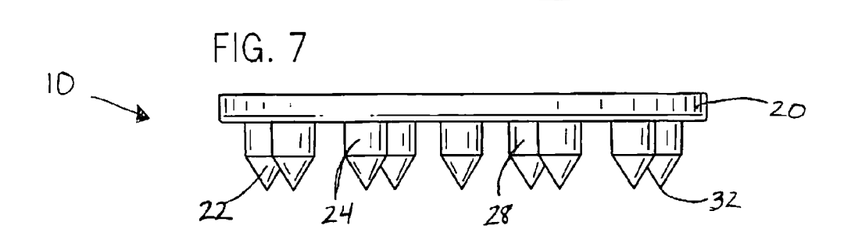
FIG. 7 is a side elevation view of the vase of FIG. 1.
Figure 8A:
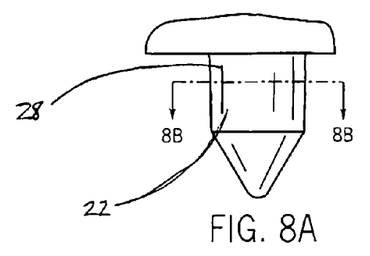
FIG. 8A is a partial side elevation view of an exemplary well capable of use with exemplary vases and FIG. 8B is a section of the well taken along section line 8B-8B of FIG. 8A.
Figure 8B:
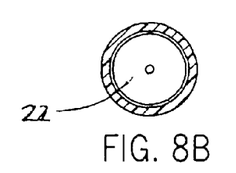
Figure 9A:
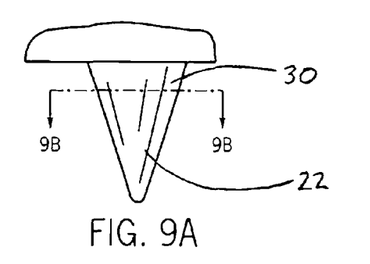
FIG. 9A is a partial side elevation view of a further exemplary well capable of use with exemplary vases and FIG. 9B is a section of the well taken along section line 9B-9B of FIG. 9A.
Figure 9B:
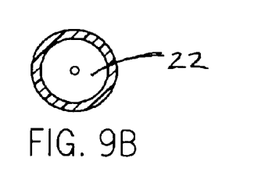
Figure 10A:
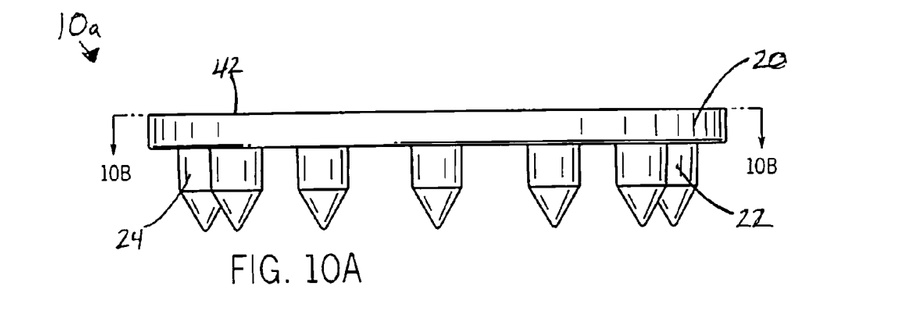
FIG. 10A is a side elevation view of a further vase embodiment, including a generally annular reservoir configuration.
Figure 10B:
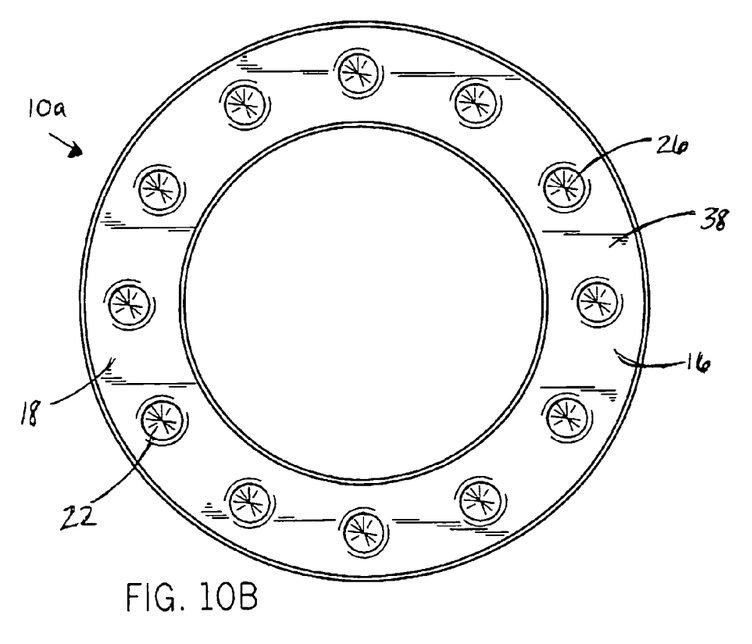
FIG. 10B is a top plan view of the vase embodiment of FIG. 10A taken in the direction of line 10B-10B of FIG. 10A.
Figure 11A:
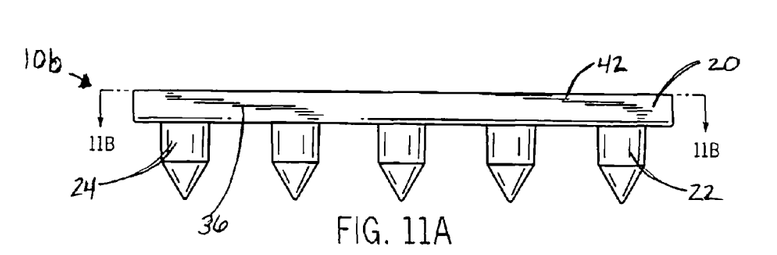
FIG. 11A is a side elevation view of a yet another vase embodiment, including a generally rectangular reservoir configuration.
Figure 11B:
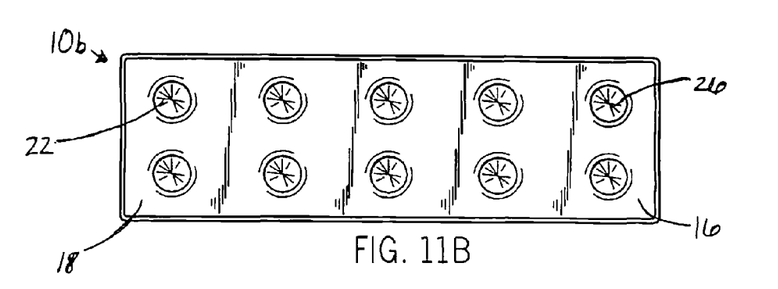
FIG. 11B is a top plan view of the vase embodiment of FIG. 11A taken in the direction of line 11B-11B of FIG. 11A.
Figure 12A:
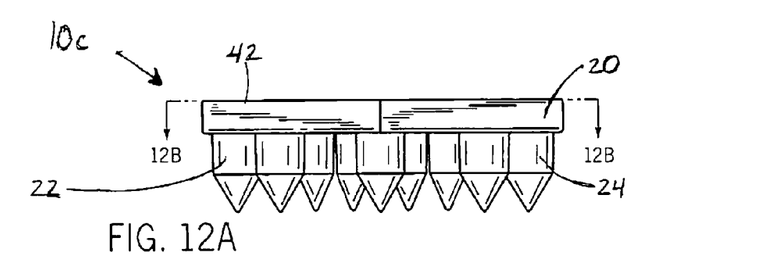
FIG. 12A is a side elevation view of a still another vase embodiment, including a reservoir configuration in the form of a polygon.
Figure 12B:
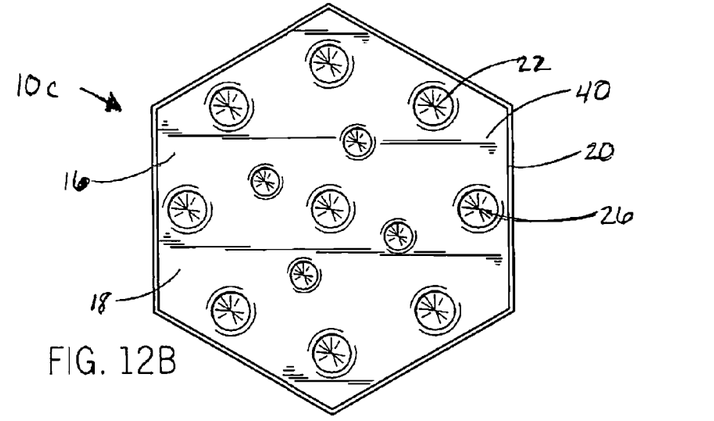
FIG. 12B is a top plan view of the vase embodiment of FIG. 12A taken in the direction of line 12B-12B of FIG. 12A.

FIGS. 1-13 show various exemplary vase 10 embodiments. The term "vase" as used herein, refers to a vessel for holding flowers (fresh flowers or artificial flowers), floral picks or decorative items and things. As shown in FIGS. 1 and 2, vases 10, 10a, 10b, 10c are preferably designed to permit the association of flowers 12, plant material, and other decorative objects and things with cakes 14, breads, pastries, and other food products. Vases 10, 10a, 10b, 10c enable a pastry chef, cake designer or anyone else decorating a cake or other food product to create decorative designs in these types of food products by permitting the decorator to easily decorate these types of food products with flowers and other decorative items. Vases 10, 10a, 10b, 10c may be designed such that only one vase 10, 10a, 10b, 10c is necessary for each cake 14 or food item that is being decorated.

Referring to FIGS. 1-7, vase 10, and vases 10a, 10b, 10c may be designed to hold at least two, three, four, five, six, seven, eight, nine, ten, eleven, twelve or more real/fresh flowers 12 to create a "bouquet effect" or other decorative presentation. This capability to hold multiple flowers 12 and to create floral arrangements is a potential advantage which distinguishes vase 10 from products or art designed to hold a single flower 12 or flower stem 44. However, depending on the size of cake 14 (or other food product) being decorated, the size of vase 10 being used, and the desired decorative effect, it is certainly possible to use more than one vase 10 on a single cake 14.

Vase 10, and vases 10a, 10b, 10c include a reservoir 16, preferably capable of holding water used to hydrate live flowers or plant material. Such a vase 10 would be made of a material which would hold water. Reservoir 16 is defined by bottom wall 18 and upright rim 20 projecting from bottom wall 18. Vase 10, and vases 10a, 10b, 10c, also include plural flower-stem-receiving wells 22. Each well 22 is defined by at least one well wall 24 depending from bottom wall 18 and having a top opening 26. Top opening 26 is capable of receiving water from reservoir 16. The top opening 26 of one or more wells 22 may be partially covered, for example by a sieve-like structure which would prevent debris from entering the well 22.

Vase 10, and vases 10a, 10b, 10c are designed to hold water in an amount sufficient to avoid wilting of flowers 12 and to extend, or maximize, the time during which the fresh flowers (or other floral products) may be displayed. Additional water could be added from time to time during display as desired to further extend display time.

Vase 10, and vases 10a, 10b, 10c, may also be used with artificial or "fake" flowers 12 made of silk (or any other materials or ingredients), in which case water would be unnecessary. Vase 10 may also be used separate and apart from a cake 14 or food product. In such embodiments vase 10 would be used as a stand-alone vase 10. The vase 10 could be used for many purposes including decorative display of articles, display or preservation of living flowers 12 and plant material, other live items, and/or for decorating with other items such as artificial or "fake" flowers.

Vase 10, and vases 10a, 10b, 10c, can be manufactured from a food-safe material well known in the art, which may include plastics, metals, glass and other materials and which may also be dishwasher safe. The material may be approved by the U.S. Food and Drug Administration, or other relevant authorities, if necessary. One appropriate method of manufacturing would be to produce vase 10, and vases 10a, 10b, 10c, from plastic material by applying force with a thermally-pressed mold or any other method well known in the art (e.g., plastic injection molding). Such a vase 10 would represent a type of integral, or formed-together unitary product. Vase 10 may be reusable and can last indefinitely with proper use and care. Alternatively, vase 10 may be manufactured to be disposable with a more limited product life cycle.

As shown in FIGS. 1-13, vase 10, and vases 10a, 10b, 10c, are preferably designed to minimize contact between flowers 12, plant material, other decorative items, and cake 14. In the examples, bottom wall 18, well walls 24, and rim 20 provide a barrier between the flowers 12, plant material, other decorative items, and the cake 14. Bottom wall 18, well walls 24 and/or rim may provide complete or partial separation between flowers 12 and the cake 14 or food product. Artificial flowers, for example, may not require complete separation from the cake 14 or food product. The barrier provided by vase 10, and vases 10a, 10b, 10c, between flowers 12 and cake 14 or other food product prevents or limits transfer of flower toxins, preservatives and/or pesticides, or other contaminants, from flowers 12, other plant material, or decorative items to the cake 14 or food product. Limiting or preventing contact between flowers 12 and cake 14 may also improve the quality, taste, or appearance of the cake 14 or food product by preventing discoloration or transfer of unpleasant flavors to the cake 14 or food product.

Vase 10, and vases 10a, 10b, 10c, can be made in any color, or combination of colors. Vase 10 may be clear or partially clear. The color of vase 10 will not likely have a direct effect on its functionality, although color could affect the appearance of a decorated cake 14 or the appearance of vase 10 when used on a stand-alone basis separate from any cake 14 or food item.

As illustrated in FIGS. 10A through 12B, vases exemplified by vases 10a, 10b, 10c, can take nearly any shape imaginable including but not limited to a circular shape 34, a rectangular shape 36, and a ring shape 38 in sizes commonly associated with cakes 14 and/or any other relevant food items. Stated another way, reservoir 16 of vases 10, 10a, 10b, and 10c is provided with a cross-sectional area in the form of a circle 34, a rectangle 36, a ring 38, and a polygon 40, respectively. The ability to provide vase 10 in virtually limitless shapes provides the pastry chef or designer with great flexibility to select a vase which covers some or all of the cake 14 or other food product thereby enhancing opportunities for creative design.

As shown in FIGS. 1-7, a "full circular" version of vase 10 can be used to support flowers 12 used to decorate a standard 8-inch diameter circular cake 14, it being understood that all cake 14 and vase 10 sizes cited herein are for illustrative and example purposes only. The "full circular" version of vase 10 can be described as a plate or disk with an approximately ¾-inch upright rim 20 along its top perimeter 42 (not unlike a shallow bowl) that can hold water poured into reservoir 16.

Wells 22, extend downward (i.e., in a direction opposite of rim 20) from bottom wall 18 to receive one or more flower stems 44 and to serve as a base for supporting the flower stem 44 ends. Wells 22 also hold water, furthering use of the vase 10 as a reservoir 16. Wells 22 may be of any appropriate shape. For example and as shown in FIGS. 8A through 9B, wells 22 may be frusto-conical 28, a cylinder ending in a cone 28, conical 30, or roughly conical or finger-tip shaped. Wells 22 also have a distal end 32 which forms a point permitting ease of insertion into a cake 14 or other food product.

The size, shape, diameter, and other measurements and dimensions of vase 10 can vary greatly depending on a desired use and/or decorative effect. Thus the size, shape, diameter, and other measurements and dimensions of the wells 22 and rim 20 can be varied. There is no particular limitation with respect to the volume of each well 22 as defined by well wall 24. The number of wells 22 can also vary greatly depending on a desired use and/or decorative effect.

In a method of cake 14 or food-product decoration, vase 10, or vases 10a, 10b, 10c, is inserted, distal end 32 of wells 22 first, into the top of a frosted, decorated, ready, or otherwise prepared cake 14. In such exemplary method, the plural wells 22 are simultaneously placed into the surface of the cake 14 as shown, for example, in FIGS. 1 and 2. The wells 22 displace a small amount of cake 14 (not unlike insertion of candles into a cake 14) until inserted well walls 24 are inserted into cake 14. Typically, but not necessarily, vase bottom wall 18 rests gently on the surface of cake 14, with the top of the upright rim-top perimeter 42 being the "highest point" of vase 10. In the example, the upright rim-top perimeter 42 is slightly higher than the top of cake 14 itself (in this example, approximately ¾ of an inch).

Water is then added to vase 10 reservoir 16. Preferably, enough water is added to reservoir 16 to fill wells 22 and reservoir 16 to a desired level below upright rim-top perimeter 42. Water could be added to reservoir 16 or wells 22 with a sprinkling can. Water can flow into wells 22 through top openings 26. Care should be taken to avoid water overflow, or otherwise allowing water to contact cake 14.

Fresh flowers 12 are then cut to a desired length and inserted, generally flower stem 44 first or as otherwise appropriate depending on the decorative item, into wells 22 and/or into reservoir 16 area of vase 10. Persons of skill in the art will readily appreciate that the flowers stems 44 may be positioned in wells 22 before vase 10 is placed on cake 14 or food product and well walls 24 inserted simultaneously into cake 14 or food product.

If desired, water can be added to vase 10 reservoir 16 after flowers 12 are inserted into wells 22. If desired, cake 14 (and portions of vase 10, such as rim 20) can be further decorated (such as with frosting, icing and/or any other decorative cake 14 items) after placement of vase 10 and/or flowers 12 on cake 14 or other food product.

Figure 13:
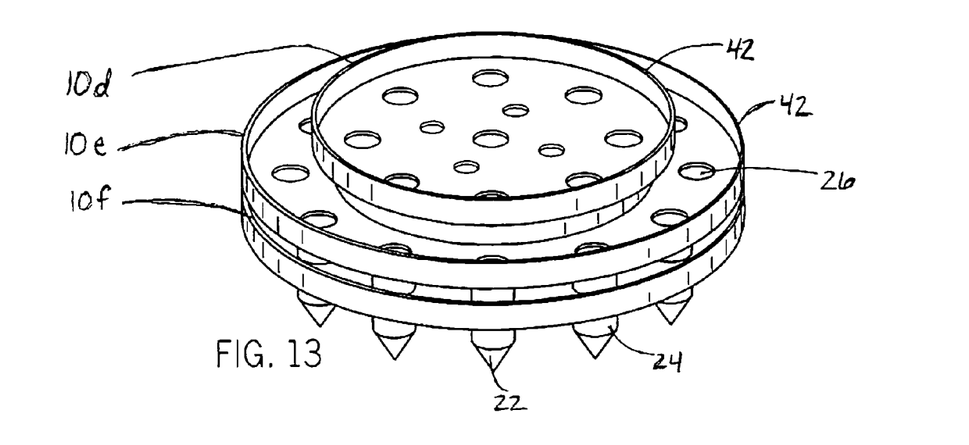
FIG. 13 shows three exemplary vases in an exemplary nested-together position.

FIG. 13 illustrates an optional aspect of vase 10. As shown in FIG. 13, the well walls 24 forming wells 22 of vase 10d may be positioned to fit through the top openings 26 of a vase 10e positioned below. FIG. 13 shows three vases 10d, 10e, 10f nested together. This feature permits plural vases 10d, 10e, 10f to be grouped together to conserve space when not being used, thereby facilitating storage or shipping to a customer.

The invention claimed is:

1. In combination, a food product and a vase for holding flowers in water on the food product comprising:
   a food product having a top surface; and
   a vase having a water-holding reservoir defined by a bottom and an upright rim projecting up therefrom, the vase further having plural flower-stem-receiving wells projecting down from the bottom, each well defining a water-receiving opening in communication with the reservoir, the wells being inserted through the top surface and into the food product such that the bottom rests directly on the food product top surface and the vase is positioned on the food product to hold flower stem ends and water in the wells beneath the top surface, the vase being free of structure spacing the bottom from the food product top surface so that the bottom can rest directly on the food product top surface to minimize the appearance of the fully-mounted vase on the food product.

2. The combination of claim 1 wherein the vase is an integral part.

3. The combination of claim 2 wherein the vase comprises plastic material.

4. The combination of claim 1 wherein the vase has a periphery and the upright rim is around the periphery.

5. The combination of claim 1 wherein each well is defined by at least one well wall.

6. The combination of claim 5 wherein each well has a narrowed distal end for ease of well insertion into the food product.

7. The combination of claim 5 wherein the distal end of each well forms a point.

8. The combination of claim 5 wherein each well defines a cylinder ending in a cone.

9. The combination of claim 5 wherein each well is frusto-conical.

10. The combination of claim 5 wherein each well is conical.

11. The combination of claim 1 wherein the reservoir has a cross sectional area in the form of a circle.

12. The combination of claim 1 wherein the reservoir has a cross sectional area in the form of a polygon.

13. The combination of claim 1 wherein the reservoir has a cross sectional area in the form of a ring.

14. The combination of claim 1 wherein the water-receiving opening of each well is a top opening.

15. In combination, a food product and a vase for holding articles on the food product comprising:
   a food product having a top surface; and
   a vase having a water-holding reservoir defined by a bottom and an upright rim projecting up therefrom, the vase further having plural wells projecting down from the bottom, each well defining a water-receiving opening in communication with the reservoir and having a distal end, the wells being inserted through the top surface and into the food product such that the bottom rests directly on the food product top surface and the distal ends are within the food product, the vase being free of structure spacing the bottom from the food product top surface so that the bottom can rest directly on the food product top surface to minimize the appearance of the fully-mounted vase on the food product.

16. The combination of claim 15 wherein the articles comprise flowers having stems with ends, the stems being inserted into the wells with the stem ends beneath the top surface of the food product.

17. The combination of claim 16 further comprising water within the reservoir and the wells to hydrate the flowers.

18. The combination of claim 16 wherein the vase is a one-piece article.

19. The combination of claim 18 wherein the vase comprises plastic material.

\* \* \* \* \*